United States Patent
Pluis

(10) Patent No.: US 10,790,109 B2
(45) Date of Patent: Sep. 29, 2020

(54) IMAGE INTENSIFIER SENSOR AS WELL AS AN IMAGING DEVICE COMPRISING SUCH AN IMAGE INTENSIFIER SENSOR

(71) Applicant: PHOTONIS NETHERLANDS B.V., Roden (NL)

(72) Inventor: Bjorn Pluis, Roden (NL)

(73) Assignee: PHOTONIS NETHERLANDS B.V., Roden (NL)

( * ) Notice: Subject to any disclaimer, the term of this patent is extended or adjusted under 35 U.S.C. 154(b) by 363 days.

(21) Appl. No.: 15/506,965

(22) PCT Filed: Aug. 13, 2015

(86) PCT No.: PCT/NL2015/050577
§ 371 (c)(1),
(2) Date: Feb. 27, 2017

(87) PCT Pub. No.: WO2016/032326
PCT Pub. Date: Mar. 3, 2016

(65) Prior Publication Data
US 2017/0250049 A1    Aug. 31, 2017

(30) Foreign Application Priority Data
Aug. 29, 2014  (NL) .................................. 2013386

(51) Int. Cl.
*H01J 31/50* (2006.01)
*H01J 31/26* (2006.01)
(Continued)

(52) U.S. Cl.
CPC ............ *H01J 31/507* (2013.01); *G02B 23/12* (2013.01); *H01J 29/023* (2013.01); *H01J 29/085* (2013.01);
(Continued)

(58) Field of Classification Search
CPC ...... H01J 31/507; H01J 29/023; H01J 29/085; H01J 29/481; H01J 29/88; H01J 31/26; H01J 31/49; G02B 23/12
See application file for complete search history.

(56) References Cited

U.S. PATENT DOCUMENTS

| | | | |
|---|---|---|---|
| 5,177,350 A | 1/1993 | Beauvais et al. | |
| 2009/0108180 A1 | 4/2009 | Saldana | |
| 2012/0069433 A1* | 3/2012 | Adams ................... | G02B 23/12 359/409 |

FOREIGN PATENT DOCUMENTS

EP    2 180 498 A1    4/2010

OTHER PUBLICATIONS

International Search Report for PCT/NL2015/050577 dated Jul. 1, 2016.

* cited by examiner

*Primary Examiner* — Georgia Y Epps
*Assistant Examiner* — Don J Williams
(74) *Attorney, Agent, or Firm* — Shumaker, Loop & Kendrick, LLP

(57) ABSTRACT

An image intensifier sensor for acquiring, amplifying and displaying images and including a vacuum envelope, the image intensifier sensor including a photocathode arranged for releasing photoelectrons into the vacuum envelope upon electromagnetic radiation acquired from the images which impinges the photocathode, an anode, spaced apart from and in facing relationship with the photocathode, arranged for receiving the photoelectrons and converting the photoelectrons for displaying the images on the basis thereof, and a power supply unit for providing power to the image intensifier sensor, wherein the image intensifier sensor further includes potting material, wherein the potting material comprises a foam compound.

15 Claims, 3 Drawing Sheets

(51) Int. Cl.
*H01J 31/49* (2006.01)
*G02B 23/12* (2006.01)
*H01J 29/02* (2006.01)
*H01J 29/08* (2006.01)
*H01J 29/48* (2006.01)
*H01J 29/88* (2006.01)

(52) U.S. Cl.
CPC ............ *H01J 29/481* (2013.01); *H01J 29/88* (2013.01); *H01J 31/26* (2013.01); *H01J 31/49* (2013.01)

IMAGE INTENSIFIER SENSOR AS WELL AS AN IMAGING DEVICE COMPRISING SUCH AN IMAGE INTENSIFIER SENSOR

FIELD OF THE INVENTION

The present invention relates to image intensifier sensors for acquiring, amplifying and displaying images.

The invention further relates to a low-light imaging device comprising such an image intensifier sensor.

BACKGROUND OF THE INVENTION

An image intensifier sensor is a device that intensifies, in other words, amplifies, low-light level images to levels of light such that they can be seen with the human eye. Image intensifiers, as commonly known, are comprised out of roughly three main components; a photocathode, an electron multiplier and an anode, all contained in a vacuum envelope.

More particularly, the photocathode is arranged for releasing photoelectrons into the vacuum envelope upon electromagnetic radiation acquired from the images, which radiation impinging the photocathode.

The anode is spaced apart from the photocathode and is in facing relationship therewith. It is arranged for receiving the photoelectrons from the photocathode and converting these photoelectrons such that on the basis thereof the images (an amplification of the images) can be produced.

The sensor can also comprise electron multiplier means. If the sensor is an analogue direct view system, these electron multiplier means are common and positioned between the photocathode and the anode and arranged for multiplying the photoelectrons from the photocathode and releasing the multiplied photoelectrons towards the anode. At this step each photoelectron can release multiple further photoelectrons and provide amplification as such.

In the sensor a power supply unit provides power, for example by converting power from one or several batteries to the voltages required by the system. By providing a high voltage potential between photocathode and the electron multiplier means, between the input face and output face of the electron multiplier means and between the electron multiplier means and the anode the photoelectrons are accelerated thereby increasing the amplification effect.

The sensor can be incorporated into for example a low-light imaging device, together with other parts such as a lens or lens assembly when for example contained in a night vision device.

Night vision devices are a typical application for image intensifier sensors as described above. They can be digital systems with a semiconductor as anode, or an analogue direct view system with a phosphor screen as anode, and can comprise image intensifier sensors for obtaining an intensified, i.e. amplified, display of a scene, i.e. an still image or a series of images. These night vision devices are frequently mounted on a weapon, a helmet or directly head mounted as goggles and be comprised of one, two or even more image intensifier sensors.

Due to the fact that night vision devices are often man portable devices, the weight of a night vision device is one of the major criteria for preferring one night vision device to another. Weight can be a major drawback in the use of such devices, can negatively affect the mission results and can even pose a health risk when used for prolonged periods of time. The image intensifier contributes to the weight of these devices to a large degree.

Since mission requirements are ever increasing and night vision users need to be able to travel great distances and carry (together with the night vision device) high amounts of other equipment, there is a long felt need for reducing weight on equipment used at such missions.

SUMMARY OF THE INVENTION

Since image intensifier sensors significantly contribute to the weight of a night vision device it is an object of the present invention to overcome at least some of the disadvantages of prior art image intensifier sensors by providing an image intensifier sensor with reduced weight, without giving in on functionality and quality.

The object is achieved by providing, in a first example, an image intensifier sensor for acquiring, amplifying and displaying images and comprising a vacuum envelope, the image intensifier sensor comprising:

a photocathode arranged for releasing photoelectrons into the vacuum envelope upon electromagnetic radiation acquired from the images which impinges the photocathode;

an anode, spaced apart from and in facing relationship with the photocathode, arranged for receiving the photoelectrons and converting the photoelectrons for displaying the images on the basis thereof; and a power supply unit for providing power to the image intensifier sensor; wherein the image intensifier sensor further comprises potting material.

In particular the present invention is characterized in that the potting material comprises a light-weight potting material, wherein the light-weight potting material comprises a foam compound.

As stated, image intensifier sensors are significant contributors to the total weight of a night vision device. In particular they can add up to about 20-40% of the total weight of such a night vision device. The weight of the device can be explained by different factors. On the one hand, they should be compliant to strong environmental requirements dealing with a large range of temperatures for operation and storage, strong shock and vibration resistance, humidity resistance and other requirements which typically represent the potential use of image intensifier sensors while mounted into night vision devices which is typically of military grade. On the other hand, image intensifier sensors have their own assembly constraints like prevention of high voltage leakage currents, high voltage discharge and the like.

In order to comply with these requirements and constraints, prior art image intensifier sensors have been potted. Potting is a process wherein electronics or fragile components are filled with a solid compound to increase the resistance to shock and vibration. Potting materials used in prior art image intensifier sensors are typically made from thermo-setting potting materials such as curing resins and thermo-setting plastics and protect the various components within the device.

Due to the high and specific requirements of the image intensifier sensors it has been a common technique to use these solid compounds to guarantee the devices meets the requirements and specifications set when used for military application. However, this type of potting material is very heavy and therefore contributes to a large degree to the total weight of the image intensifier sensors and as such, to the total weight of the night vision device.

The inventors came to the insight that the requirements of the image intensifier sensors can be divided into several function specific requirements that correspond to different components of the night vision device. Since these components are located at different positions within the night vision device, i.e. the input side and output side of the vacuum envelope, the power supply unit etc. different positions with device demand different requirements. At least some of these requirements can be met by alternative potting material than the standard thermo-setting potting materials such as curing resins which are commonly used in prior art devices.

In accordance with the present invention it is proposed to at least partially replace the standard potting material of image intensifier sensors by potting material with a lighter weight in order to obtain a lighter imager intensifier sensor which can be used to lower the weight of night vision devices in which these are incorporated.

In an example the potting material can comprises any one or more of the materials: polystyrene, polystyrene foam, expanded polystyrene, extruded polystyrene, acrylonitrile butadiene styrene, light-weight curing epoxy resign, silicon, polyurethane, polyurethane foam, light-weight epoxy and the like.

The person skilled in the art will understand that different types of polymers, silicon and epoxy's can be used which all have different function specific properties. Some materials are more light-weight than others, have better high voltage isolation properties, are better air tight, prevent humidity to penetrate, have good shock absorption properties, etc. As such, the most suitable material can be used.

In another example the image intensifier sensor comprises multiple potting materials according to any the previous descriptions. The potting material can not only be replaced as whole by a potting material which is more light-weight than the potting material commonly used, it can also be replaced partly for only specific parts within the image intensifier sensor. The potting material can be replaced by a single new light-weight potting material, or by a combination of potting materials described above.

In yet another example the image intensifier sensor comprises high voltage isolating potting material in the circumference of the photocathode near the input face of the image intensifier sensor where the photons enter, and/or comprise light-weight potting material in the circumference of said vacuum envelope as a filler material at the middle part of and near the output face of the image intensifier sensor where the anode is located and/or comprises high voltage isolating potting material around the circumference of the power supply unit or within the housing thereof.

As indicated, a night vision device comprises, amongst others, at least one image intensifier sensor. Such an image intensifier sensor in turn comprises at least a vacuum envelope and a power supply unit. The vacuum envelope comprises a photocathode, electron multiplier means and an anode (for example a phosphor screen).

The power supply unit has to generate high voltages to be applied to the vacuum envelope for, amongst others, accelerating the photoelectrons towards the anode. These high voltages increase the risk of a voltage breakdown. As such, the power supply unit can be provided with a potting material with high resistance to voltage breakdown, i.e. being high voltage resistant. An example of such a material can be epoxy resin, polyurethane resin, silicone resin, polyester or any of the potting materials described above.

Once the power supply unit has been provided with potting material, the circumference of the vacuum envelope can be provided with light-weight potting material also. Since within the vacuum envelope high voltage potentials are applied that are provided by the power supply, the requirements for the potting material potting of the vacuum envelope are that it should be able to resist these high voltages also. Hence, prevent voltage breakdown and leakage of radiation outside the envelope by a high voltage resistant potting material. As such, it can be provided, in particular around its circumference, with for example an epoxy resin, polyurethane resin, silicone resin, polyester or any of the potting materials described above.

The rest of the volume of the housing of the image intensifier sensor can be provided with a light-weight potting materials as well. Since the major requirements for the rest of housing is to increase resistance to/absorb shocks, this can be a very light-weight filler potting material for example based on foaming properties. Examples of such suitable materials are polystyrene foam, expanded polystyrene, extruded polystyrene, polyurethane foam, light-weight epoxy, or any of the other potting materials described above.

In a further example the image intensifier sensor according to the invention comprises an anode comprising a phosphor screen. The anode of a direct vision image intensifier sensors mostly comprises a phosphor screen. This phosphor screen is a thin phosphorous light emitting layer deposited on the inside of the output windows of the image intensifier sensor (usually fiber optics) and converts the electrons from the electron multiplier unit that impinge the phosphor screen back into photons, hence visible light. Although image intensifier sensors mostly comprise phosphor screens as an anode to convert the photoelectrons back into a visible image, the present invention is not limited to such an anode. Other semiconductor based anodes like digital image sensors also apply.

In a further example the image intensifier sensor according to the invention comprises electron multiplier means that comprise a microchannel plate. Most modern image intensifier sensors nowadays are comprised of a microchannel plate. The photoelectrons generated by the photons impinging the photocathode will be accelerated and focused towards the microchannel plate within the vacuum envelope by use of applying a high voltage potential over it. When a photoelectron strikes the inner wall of one channel of the microchannel plate, several secondary electrons are generated by this impact. Each of these secondary photoelectrons will in turn be accelerated within the microchannel plate by another high voltage potential, which once again strike the inner wall of the channel, and thereby generate even more secondary photoelectrons. This process is continuous for the whole depth of the microchannel plate. For each photoelectron entering a channel, approximately thousand secondary electrons are generated from the exit of the channel and subsequently accelerated by a further high voltage potential applied over the microchannel plate and the phosphor screen. The process as a whole generates an intensified image, which is much brighter than the original image and enables clear view for a night vision device wherein the scene is visible for the human eye. Although image intensifier sensors mostly comprise a microchannel plate (or multiple microchannel plates) as electron multiplier means, the present invention is not limited to such multiplier. Other secondary emission means also apply.

In an example the image intensifier sensor according comprises an anode, which is arranged for visible light and/or infra-red light. The present invention is not limited in any way to a particular radiation spectrum. For example, in its most common application an image intensifier sensor according to the invention is arranged for visible light. It however can also be arranged for infra-red light to generate amplified image based on thermal radiation. In yet another example a night vision device can be comprises out of one, two or more visible light image intensifier sensors, one, two or more infra-red image intensifier sensors or a combination thereof.

In a second example a low-light imaging device is provided such as a head-, or weapon-mountable night vision device comprising at least one of said image intensifier sensors according to any of the previous descriptions.

DETAILED DESCRIPTION

For an enhanced clarification of the invention in the following description the same parts will be indicated and referred to with the same referral numerals.

Figure 1:
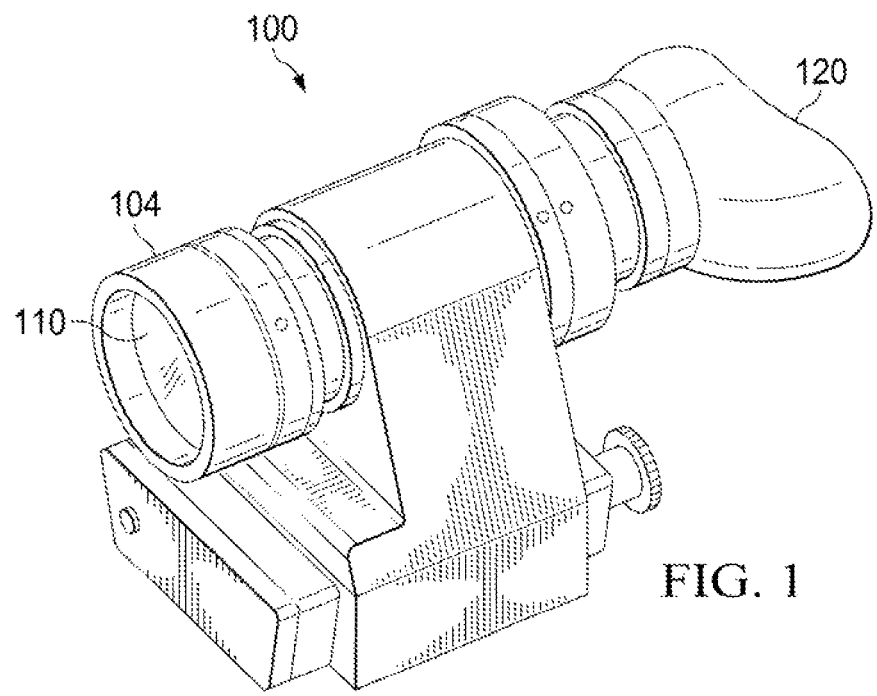
FIG. 1, shows in a perspective view an illustration of a night vision device.

In FIG. 1 in a perspective view an illustration of a night vision device is disclosed in detail. The various part thereof are merely illustrative and the invention of an image intensifier sensor is not limited in any way to be arranged to be incorporated in a specific night vision device as indicated in FIG. 1. Further, the features are not drawn to scale and used for illustration only. The person skilled in the art will recognize the numerous modifications and configurations possible that still fall within the scope of the appended present claims.

In FIG. 1 a night vision device 100 is disclosed that can be used stand alone or to be mounted on a weapon, or head, for example on a helmet. The device 100 comprises a lens assembly 110 comprising one or more lenses to allow ambient light to enter the device at the input face thereof. At the other end of the device 100, at its output face an eyepiece 120 is provided and arranged for a user to see the amplified, i.e. enhanced, image captured by the device. Further there can be rotational focus setting means 104 to adjust the focus of the image. Within the device 100, behind the lens assembly 110 and between the lens assembly and the eyepiece 120 the device comprises an image intensifier sensor.

Figure 2:
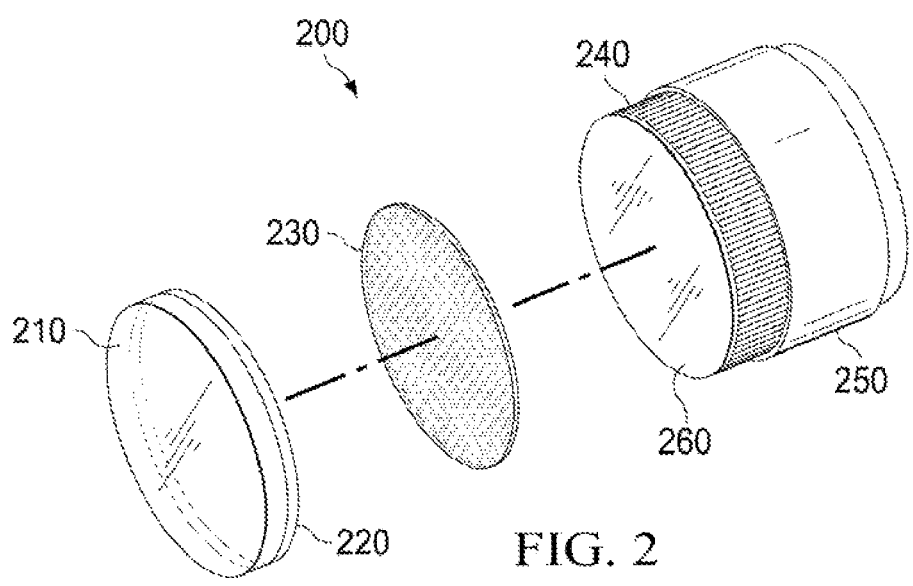
FIG. 2, shows in a cutaway perspective view an image intensifier sensor.

Turning to FIG. 2 there is shown a cutaway perspective view of an image intensifier sensor as comprised in the device 100 of FIG. 1. The image intensifier sensor 200 comprises a photocathode 220, electron multiplier means 230 and an anode 260. The photocathode 220 is a very thin light-sensitive film that is bonded to or deposited on the back side of a glass plate 210 at the input face of the sensor. When a photon of an image is applied through the glass place 210 onto the photocathode 220 the photocathode emits photoelectrons into the vacuum envelope towards the electron multiplier means 230 and the anode 260. The pattern of pattern of the photoelectrons emitted by the photocathode corresponds to image captured at the input face and thus the corresponding pattern of photons impinging the photocathode 220. The photoelectrons are accelerated from the photocathode 220 by a high negative voltage potential applied to the photocathode in respect of the input face of the electron multiplier means 230.

The electron multiplier means are in its most common embodiment provided in the form of a microchannel plate 230. The photoelectrons generated by the photons impinging the photocathode 220 will be accelerated and focused towards the microchannel plate 230 within the vacuum envelope by use of applying a high voltage potential over it, as indicated. When a photoelectron strikes the inner wall of one channel of the microchannel plate 230, several secondary electrons are generated by this impact. Each of these secondary photoelectrons will in turn be accelerated within the microchannel plate by another high voltage potential, which once again strike the inner wall of the channel, and thereby generate even more secondary photoelectrons. This process is continues for the whole depth of the microchannel plate 230. For each photoelectron entering a channel, approximately thousand secondary electrons are generated and subsequently accelerated by a further high negative voltage potential applied to the microchannel plate in respect of the anode 260. A power supply unit 250 that is present at the output face of the device provides these voltages. Although image intensifier sensors mostly comprise a microchannel plate (or multiple microchannel plates) 230 as electron multiplier means, the present invention is not limited to such multiplier. Other secondary emission means also apply.

The primary and secondary photoelectrons from the microchannel plate 230 will imping on the anode which is most commonly provided in an image intensifier sensor as a phosphor screen 260. The phosphor screen 260 will convert the impinging photoelectrons back into photons and hence, visible light by which the image at the input face of the sensor 200 is displayed at its output face such as to be seen by the user at the eyepiece 120 shown in FIG. 1. The phosphor screen is deposited onto the input face of a glass disk 240 or fiber optic 240. This disk or optics 240 will direct the light towards the end face of the device for viewing by the user.

Figure 3:
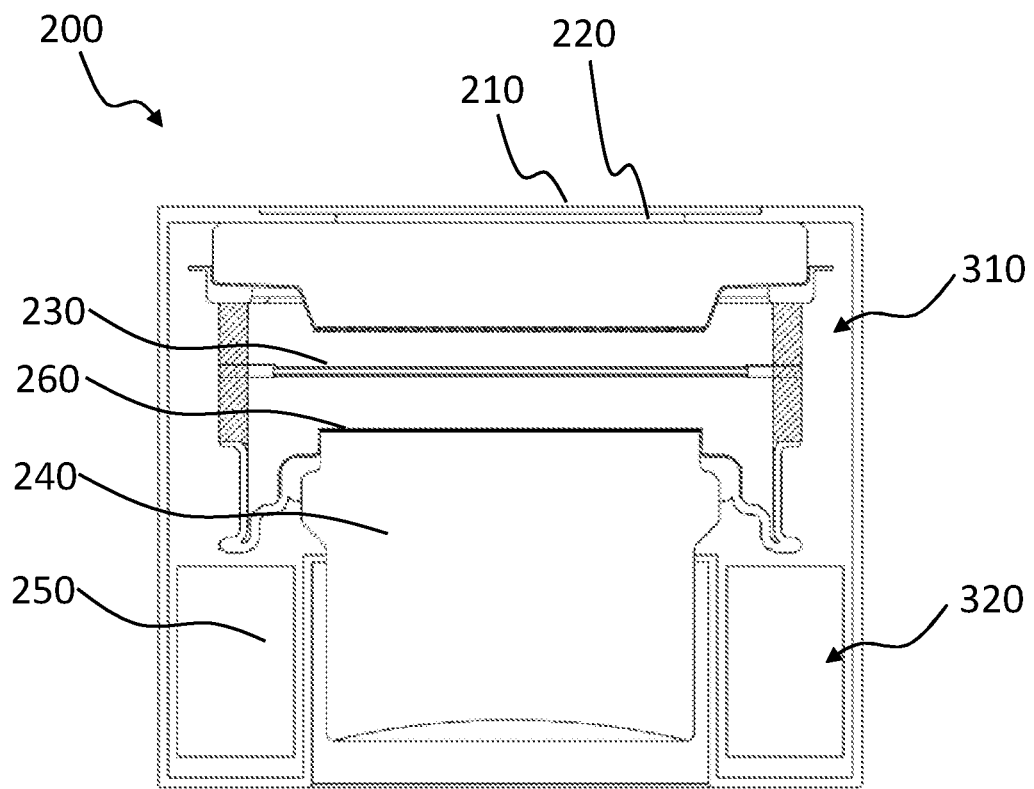
FIG. 3, shows in a longitudinal section view of an image intensifier sensor according to the prior art.

In FIG. 3 there is shown in more detail a longitudinal section of the image intensifier sensor of FIG. 2. The image intensifier sensor 200 is comprised of a photocathode 220, a microchannel plate 230 and a phosphor screen 260. FIG. 3 clearly illustrates the vacuum envelope, which is on the one side contained by the glass plate 210 and the photocathode 220 deposited thereon, and on the other side by the fiber optics 240 and the phosphor screen deposited thereon. In between is the microchannel plate 230 which functions as a secondary electron emission device. Furthermore FIG. 3 illustrates the position of the power supply unit 250 or units provided in the circumference of the image intensifier sensor near the end, i.e. exit/output face thereof.

As stated, image intensifier sensors are significant contributors to the weight of a night vision device. In particular they can add up to about 20-40% of the total weight of such a night vision device. The weight of the device can be explained by different factors. On the one hand, they should be compliant to strong environmental requirements dealing with a large range of temperatures for operation and storage, strong shock and vibration resistance, humidity sustainability and other requirement which typically represent the potential use of image intensifier sensor while mounted into night vision devices which is typically of military grade. On the other hand, image intensifier sensors have their own assembly constrains like high voltage leakage and the like.

In order to comply with these requirements and constrains, prior art image intensifier sensors have been potted. Potting is a process wherein electronics or fragile components are filled with a solid compound to increase the resistance to shock and vibration. Potting materials used in prior art image intensifier sensors are typically made from thermo-setting plastics and protect the various components within the device. In these prior at image intensifier sensors the same potting material is applied in the whole device.

Due to the high and specific requirements of the image sensor it has been a common technique to use these solid compounds to guarantee the devices meets is requirements and specifications set when used for military. However, this type of potting material is very heavy and therefor contributes to a large degree to the total weight of the image intensifier sensor and as such, to the total weight of the night vision device.

Figure 4:
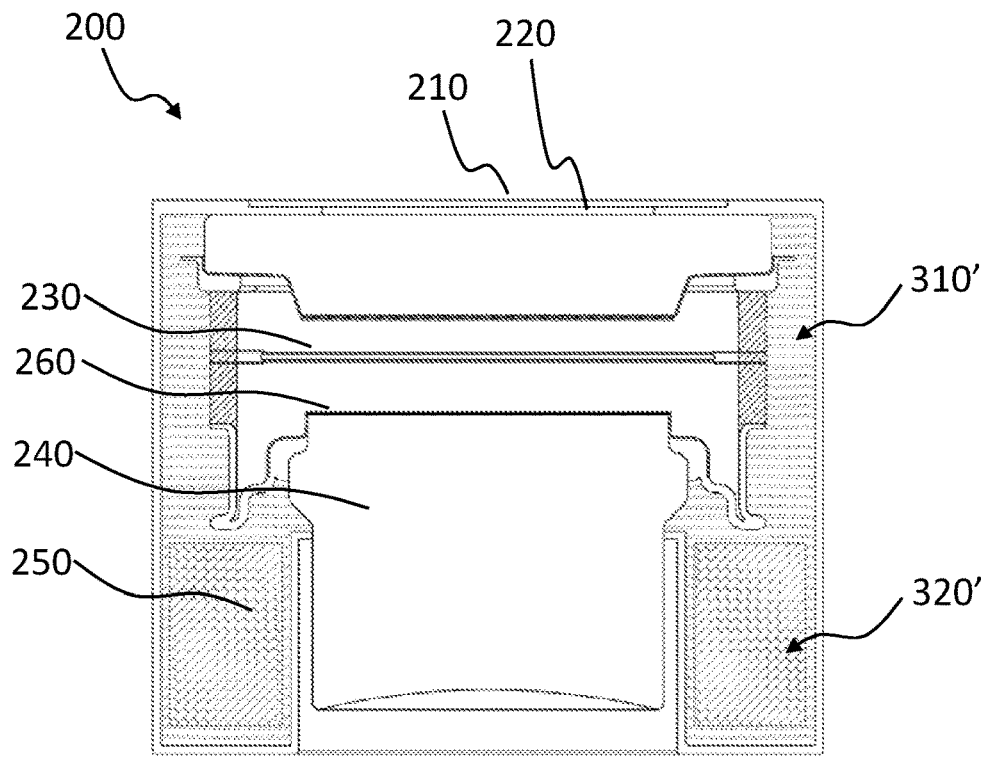
FIG. 4a, shows in a longitudinal section view of a prior art image intensifier sensor comprising potting material.
FIG. 4b, shows in a longitudinal section view of an image intensifier sensor comprising potting material according to an example of the invention.
Figure 4:
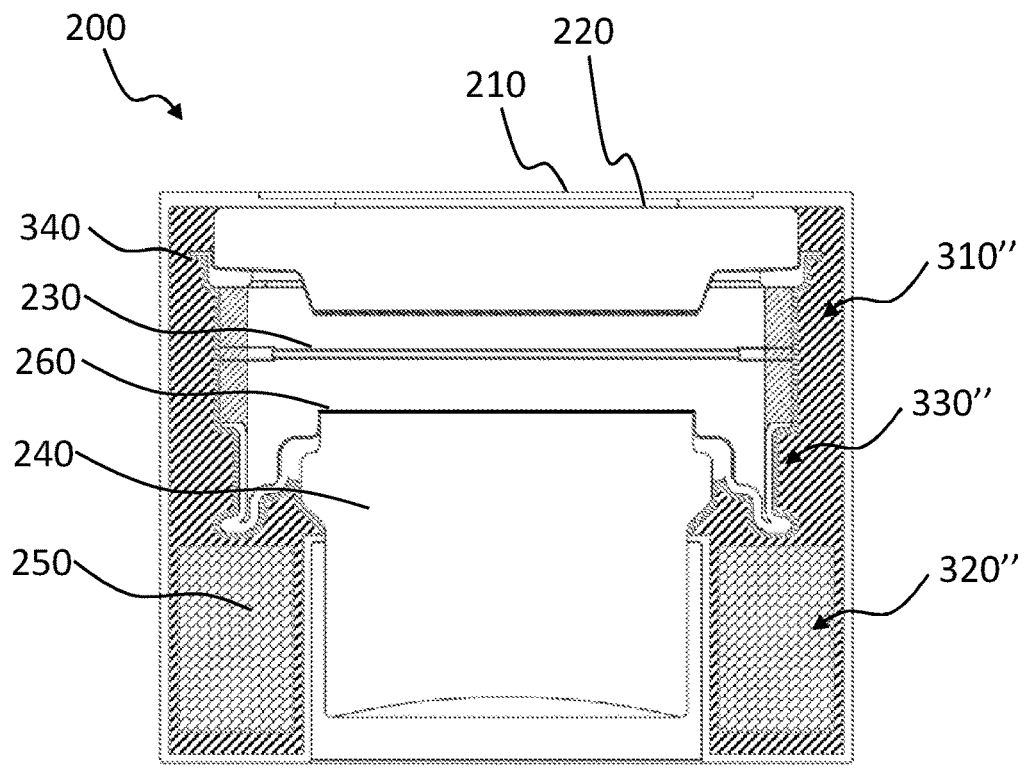

FIG. 4a shows an image intensifier sensor in accordance with the prior art wherein the spaces in the housing of the device 200 are filled with potting material for the reasons stated above. The potting materials 310', 320' however have the drawback that these are selected based on the requirements as indicated and hence high in weight. Examples of such high weight potting materials are epoxy resins and the like.

The inventors however came to the insight that the requirements of the image intensifier sensor can be divided into several function specific requirements that correspond to different components of the night vision device. Since these components are located at different positions within the night vision device, i.e. the input side and output side of the vacuum envelope, the power supply unit etc. different positions with device demand different requirements. At least some of these requirements can be met by alternative potting material than the standard thermo-setting potting materials such as curing resins, which are commonly used in prior art devices.

In accordance herewith in FIG. 4b there is provided an alternative potting solution for an image intensifier sensor wherein the sensor 200 is divided by function relating to feature located there. At position 320 the power supply unit 250 is provided which requires, due to the generation of the high voltage needed for accelerating the photoelectrons in the vacuum envelope, a high voltage resistance. Hence, prevent voltage breakdown and leakage of radiation outside the envelope by a high voltage resistant potting material. As such, it can be provided, in particular around its circumference, with for example an epoxy resin, polyurethane resin, silicone resin, polyester or any of the potting materials described above.

Since the potting material 320" of the power supply unit 250 already provides for the high voltage resistance and hence, good isolation from the envelope and housing of the sensor 200, there is less need to provide potting material with the same resistance to high voltage. Accordingly, at least part of the rest 310" of, or the whole 310", 330" space within the sensor 200 can be filled with a potting material that is very light-weight, for example based on foaming properties. Examples of such suitable materials are polystyrene foam, expanded polystyrene, extruded polystyrene, polyurethane foam, light-weight epoxy, or any of the other potting materials described above.

Alternatively, the spaces 330" and 310" can be provided with different potting materials wherein, for example, space 330" is comprised of a very light-weight filler potting material based on foam, and the space 310", due to high voltage potential near the input face of the sensor 200, of a light-weight potting material, although with better resistance to high voltage and hence voltage breakdown. As such, it can be provided, in particular around its circumference, with for example an epoxy resin, polyurethane resin, silicone resin, polyester or any of the potting materials described above.

In accordance with the description provided above, a person skilled in the art may provide modifications and additions to the device disclosed, which modifications and additions do not limit the scope of the invention, which scope of the invention is determined by the appended claims.

The invention claimed is:

1. An image intensifier sensor for acquiring, amplifying and displaying images and comprising a vacuum envelope, the image intensifier sensor comprising:
    a photocathode arranged for releasing photoelectrons into the vacuum envelope upon electromagnetic radiation acquired from the images which impinges the photocathode;
    an anode, spaced apart from and in facing relationship with the photocathode, arranged for receiving the photoelectrons and converting the photoelectrons for displaying the images on the basis thereof; and
    a power supply unit for providing power to the image intensifier sensor; wherein the image intensifier sensor further comprises potting material, wherein the potting material comprises a light-weight potting material, comprising a foam compound.

2. The image intensifier sensor according to claim 1, wherein the potting material comprises polystyrene foam.

3. The image intensifier sensor according to claim 1, wherein the potting material comprises epoxy foam.

4. The image intensifier sensor according to claim 1, wherein the potting material comprises silicone.

5. The image intensifier sensor according to claim 1, wherein the potting material comprises polyurethane foam.

6. The image intensifier sensor according to claim 1, wherein the potting material comprises one or more from the group consisting of silicone foam, polyvinyl chloride foam (PVC), polyester foam, polyamide foam, polyimide foam, phenolic foam, polyisocyanurate foam, polyicynene foam, melamine foam and polyethylene foam.

7. The image intensifier sensor according to claim 1, wherein the image intensifier sensor comprises multiple potting materials.

8. The image intensifier sensor according to claim 7, wherein the image intensifier sensor comprises high voltage isolating potting material in then circumference of the photocathode.

9. The image intensifier sensor according to claim 8, wherein the image intensifier sensor comprises light-weight potting material in hen circumference of the vacuum envelope.

10. The image intensifier sensor according to claim 8, wherein the image intensifier sensor comprises high voltage isolating potting material in a circumference of the power supply unit.

11. The image intensifier sensor according to claim 1, further comprising:
    electron multiplier means, positioned between the photocathode and -4dthe anode and arranged for multiplying the photoelectrons from the photocathode and releasing the multiplied photoelectrons towards the anode, and wherein in particular, snit the electron multiplier means comprise a microchannel plate.

12. The image intensifier sensor according to claim 1, wherein the image intensifier sensor is arranged for a direct view system and wherein the anode comprises a phosphor screen.

13. The image intensifier sensor according to claim 1, wherein the image intensifier sensor is a digital image sensor and wherein the anode comprises a semiconductor image sensor comprising a charged-coupled device (CCD) or a complementary metal-oxide-semiconductor (CMOS).

14. The image intensifier sensor according to claim 1, wherein the anode is arranged any one or more of visible light, infra-red light.

15. A low-light night vision device comprising image intensifier sensors according to claim 1.

* * * * *